United States Patent

Bodson

[15] 3,652,264
[45] Mar. 28, 1972

[54] RECOVERY OF ZINC VALUES FROM ZINC PLANT RESIDUE

[72] Inventor: Fernand Jacques Joseph Bodson, Angleur-Liege, Belgium

[73] Assignee: Societe des Mines et Fonderies de Zinc de La Vieille Montagne, S.A., Angleur-Liege, Belgium

[22] Filed: Jan. 13, 1969

[21] Appl. No.: 790,835

[30] Foreign Application Priority Data

Nov. 20, 1968 Belgium ............................... D41,993

[52] U.S. Cl. .................................. 75/101, 75/108, 75/115, 75/120
[51] Int. Cl. ....................................................... C22b 19/22
[58] Field of Search ............. 75/120, 101, 108, 115; 23/125; 204/119

[56] References Cited

UNITED STATES PATENTS

| | | | |
|---|---|---|---|
| 1,973,300 | 9/1934 | Thompson | 23/125 |
| 3,193,382 | 7/1965 | Veltman et al. | 75/115 |
| 3,434,947 | 3/1969 | Steintveit | 75/120 X |
| 3,493,365 | 2/1970 | Pickering et al. | 75/101 |

*Primary Examiner*—L. Dewayne Rutledge
*Assistant Examiner*—G. T. Ozaki
*Attorney*—Young & Thompson

[57] ABSTRACT

In a process of recovering metal values from leaching residues of zinc-bearing materials such as the leaching residues of roasted zinc concentrate, comprising subjecting said leaching residues to a subsequent leaching with a solution of dilute sulphuric acid for dissolving the zinc, adding a sulphur-bearing ore to said solution, separating a sulphurous residue from said solution, oxidizing said solution and precipitating the therein contained iron by using an oxidizing agent and adding a neutralizing agent containing zinc oxide.

8 Claims, No Drawings

RECOVERY OF ZINC VALUES FROM ZINC PLANT RESIDUE

This invention relates to a process of leaching residues of leached zinc-bearing materials with the object of recovering certain elements, principally metals and in particular zinc.

In the electrolytic process in zinc metallurgy zinc-bearing materials such as roasted blendes are subjected to leaching in dilute sulphuric acid originating from electrolysis cells. In the course of this operation a quite considerable part of the zinc is not dissolved because it is fixed in certain compounds which are insoluble under the conditions of leaching, such as, in particular, zinc sulphide and zinc ferrites ($ZnO \cdot Fe_2O_3$). This insoluble zinc, together with other elements, particularly lead and silver, is found after settling and/or filtering in a residue, commonly termed the "leaching residue."

The leaching residue contains a good many elements: some are insoluble in sulphuric acid, among these CaO, $SiO_2$ and $Al_2O_3$ being considered as non-recoverable while Pb, Ag, Sn and Au are recoverable. Certain others which are supposed to be soluble in sulphuric acid are nevertheless found in the residue because of the conditions of leaching; among these Zn, Cu and Cd are recoverable, Fe, Mg, Cl, F, Na and K are considered as non-recoverable and As, Sb, Ge, Co and Ni are deleterious as far as subsequent operations are concerned.

Various processes are already known making it possible to bring the above-mentioned soluble rand recoverable elements into solution, to separate the recoverable insoluble elements and to eliminate the insoluble, and even dangerous, elements.

The problem forming the basis of this invention is to supply a process for recovery, starting from leaching residues of zinc and other elements whether or not they are recoverable.

This problem is solved by the present invention which relates to a process in which the "leaching residue" is subjected to a subsequent leaching at atmospheric pressure and at a temperature between 50° C. and boiling point, using a dilute sulphuric acid solution, whose initial free acid concentration is between 100 grammes per liter and 250 grammes per liter, equal in quantity of two to five times the stoichiometric quantity of acid necessary to dissolve the zinc contained in the said leaching residue, which forms a sludge hereinafter called the "lead residue," containing recoverable insoluble elements such as lead, silver and gold, suspended in a solution to which is then added, at a temperature between 50° C. and boiling point, a sulphur-bearing material containing, e.g., zinc sulphide, a quantity of 1.1 to 1.5 time the quantity stoichiometrically necessary for the reduction to the ferrous state of the ferric iron present in the said solution, a sulphurous residue is separated from the said solution and the iron contained in the filtrate is precipitated, utilizing as an oxidizing agent preferably the oxygen of the air at a temperature between 50° C. and boiling point and adding a neutralizing agent containing zinc oxide such as roasted zinc concentrate in the quantity necessary to maintain a pH value of 1.7 to 3, so that the precipitating iron collects with it other impurities like arsenic, antimony, germanium and fluorine.

In the process in accordance with the invention, the treatment of the solution before the stage of iron precipitation may be carried out in a number of separate stages. Thus, there may be a leaching stage, or dissolution of zinc followed by a separating of the "leaching residue," and a reduction stage with a separating of the sulphurous residue. The separation of the "lead" and "sulphurous" residues and the iron-base precipitate is done by any known processes such as filtration, decantation or by any other method. The "lead" residue may then be treated by the conventional metallurgical methods for the recovering of recoverable insoluble elements such as lead, silver, tin and gold; as regards the sulphurous residue it may beforehand be treated to extract the contained elementary sulphur and/or treated in roasting furnaces eventually mixed with sulphurous materials.

The method provided in the invention for oxidizing and then precipitating the iron is particularly advantageous because it makes it possible to obtain a precipitate in the form of semi-hydrated iron hydroxides, such as $\alpha(Fe\ OOH)$ and $\gamma(Fe\ OOH)$, goethite and lepidocrocite, which are easy to filter or settle down. In this way are obviated all the difficulties encountered when separating a ferric hydroxide precipitate — $Fe(OH)_3$ — obtained by the neutralization of a ferric sulphate solution with a high pH value, while consuming less of the neutralizing agent, and also the loss of sulphuric acid and the addition of an alkali in the case where, in accordance with certain known methods, iron is being precipitated in the form of jarosite in a more acid medium, or else an expensive and complicated apparatus being necessary in the case where the iron is precipitated under high pressure and at high temperature.

The dilute sulphuric acid solution used in the phase of treatment of the "leaching residue" for dissolving the zinc preferably consists of acid originating from electrolysis solutions. For the reduction raw zinc concentrate is advantageously used. It has been found in the course of this operation that the sulphides of zinc and copper are dissolved preferentially to sulphides of Pb and Fe, and this with high metallurgical yields. Through this operation it is possible therefore to separate and extract from the mixed ores, the contained zinc and copper. Under the conditions of the invention, reduction yields of ferric iron in solution are obtained between 95 and 100 percent.

With regard to the oxidization phase, it should be treated that it is activated by certain catalyzing elements, particularly solubilized silica and copper as well as active carbon. In the case of the treatment of leaching residues enough copper is generally present to secure this catalytic action.

It should be noted that it is possible to carry out the treatment of the solution after reduction in two stages, the first stage consisting of a neutralization of the free acid, the second being the precipitation of the iron itself.

This neutralization may be performed by roasted zinc concentrate or any other neutralizing agent; the residue of this neutralization may advantageously be treated together with the "leaching residue" in the first stage of the present process.

Incidentally, the speeds of settling and filtration of the iron precipitate have been measured. The following values were obtained:

Speed of settling: over 4 cm. per minute.

Speed of filtration: 500 kg. per sq. meter per hour of dry residue for a cake of a thickness of 10 mm. and a pressure drop of 500 mm. mercury.

In one embodiment of the invention the said oxidization and the said precipitation are applied to a solution having a specific gravity which may be from 1.20 to 1.50; an iron content of 50 grammes per liter maximum, the $Fe^{3+}/Fe^{2+}$ weight ratio in this solution being less than 0.05, the said solution containing more than 300 mg. per liter of copper as catalyst and the grain size of the neutralizing agent being less than 200 mesh.

The present invention will now be described in a more detailed but non-restrictive manner in the following example which relates to a process carried out in three stages, i.e. a leaching stage or brining into solution of the zinc, a reduction stage and a stage of neutralization, oxidization and precipitation of the iron.

EXAMPLE

1st stage 45 liters of pulp leaching residue containing 631 grammes per litre of washed and dried solid products were mixed with 200 liters of sulphuric acid originating from electrolysis cells (spent electrolyte). The mixture was agitated and kept for 6 hours at a temperature of 90° to 85° C. The "lead" residue and the solution were then separated. The various elements in the loaded pulp on the one hand in the "lead" residue and solution obtained on the other hand were then determined. The results are shown in Table 1 below while in Table 2 the balance of several elements is shown.

TABLE 1
Analysis of various products
(All percentages are by weight)

| Element | Pulp charged | | Products obtained | | |
|---|---|---|---|---|---|
| | Leaching residue (percent) | Filtrate accompanying the leaching residue | Spent electrolyte (liquid from electrolytic cells) | "Lead" residue (percent) | Final solution |
| Total Zn | 20.21 | 160 g/l | 48 g/l | 3.68 | 85.2 g/l |
| Zn soluble in $H_2O$ | 0.19 | | | 0.32 | |
| Fe | 28.6 | | | 15.95 | 26.7 g/l |
| Pb | 8.43 | | | 19.74 | |
| Cd | 0.12 | 330 mg/l | | 0.03 | 0.19 g/l |
| Cu | 1.26 | 380 mg/l | | 0.18 | 1.47 g/l |
| Sn | 0.15 | | | 0.4 | |
| Ge | 0.0048 | 0.056 mg/l | 0.01 mg/l | 0.0034 | 3.86 mg/l |
| As | 0.24 | 0.5 mg/l | 0.125 mg/l | 0.08 | 233.4 mg/l |
| Sb | 0.06 | 0.6 mg/l | 0.01 mg/l | 0.046 | 30 mg/l |
| Ag | 320* | | | 720* | |
| $H_2SO_4$ | | 0 g/l | 162 g/l | | 30 g/l |

*g-per metric ton.

$$\frac{\text{Weight of washed and dried ``lead'' residue}}{\text{Weight of washed and dried leaching residue}} = 35.1\%$$

The yield of dissolution of the Zn, i.e., the ratio of insoluble Zn which has been dissolved is equal to:

$$\frac{\text{Insoluble Zn in the ``leaching residue''} - \text{Insoluble Zn in the ``lead'' residue}}{\text{Insoluble Zn residue of ``leaching residue''}} = 93.1\%$$

TABLE 2

| Pulp | Balance of several elements (%) | | | | | | | |
|---|---|---|---|---|---|---|---|---|
| | Fe | Pb | Ag | Cu | Cd | As | Sb | Ge |
| Filtrate accompanying the residue | 0 | 0 | 0 | 4.23 | 29.58 | 0.03 | 7.39 | 11.29 |
| Leaching residue | 100 | 100 | 100 | 95.76 | 70.41 | 99.94 | 92.59 | 88.70 |
| Spent electrolyte | 0 | 1· | 0 | 0 | | 0,03 | 0.01 | 0 |
| Products Final solution | 74.03 | 0 | 0 | 97.54 | 87.10 | 82.37 | 48.19 | 81.70 |
| "Lead" residue | 24.04 | 100 | 98.78 | 6.17 | 7.21 | 15.18 | 32.23 | 28.42 |
| Loss or gain | 1.91 | 0 | 1.22 | −3.72 | 5.69 | 2.44 | 19.57 | −10.12 |

2nd stage 4,787 grammes of raw zinc concentrate were added to 175 liters of solution obtained from the first stage. Agitation was maintained for 4 hours, the temperature varying between 95° and 100°C.

At the end of the operation 175 liters of solution were separated off and 2,202 grammes of sulphurous residue were collected. Analyses and proportions of certain elements are shown in Tables 3 and 4.

TABLE 3

Analysis of various products

| | Feed | | Products obtained | |
|---|---|---|---|---|
| | Solution before reduction | Raw Concentrate | Solution after reduction | Washed sulphurous residue |
| Quantity | 175 litres | 4,787 g | 175 l | 2,269 g |
| Zn total | 85.2 g/l | 57.70 % | 95.99 g/l | 14.10 % |
| Zn sol.$H_2O$ | | 0.8 | | 0.08 % |
| Fe total | 26.7 g/l | 1.95 % | 26.73 g/l | 3.59 % |
| $Fe^{2-}$ | 2.5 g/l | | 25,73 g/l | |
| $Fe^{3-}$ | 24.2 g/l | | 1 g/l | |
| Pb | | 3.10 % | | 5.95 % |
| Cd | 0.19 g/l | 0.19 % | 230 mg/l | 0.03 % |
| Cu | 1.47 g/l | 0.62 % | 1.7 g/l | 0.57 % |
| Ge | 3.86 mg/l | 0.002 % | 8 mg/l | 0.007 % |
| As | 233.4 inches | 0.011 % | 240 mg/l | 0.05 % |
| Sb | 30 inches | 0.015 % | 41 mg/l | 0.933 % |
| $H_2SO_4$ | 30 g/l | | 31 g/l | |

TABLE 4

| Feed | Balance of zinc and iron | |
|---|---|---|
| | Zn | Fe |
| Solution | 84.85 % | 97.66 % |
| Raw Concentrate | 15.15 % | 2.34 % |
| | 100.00 % | 100.00 % |
| Products | | |
| Solution | 95.06 % | 98.15 % |
| Sulphurous residue | 1.81 % | 1.71 % |
| Loss | 3.13 % | 0.14 % |
| Total | 100.00 % | 100.00 % |

From these tables it is possible to deduce the yields of dissolution of the zinc and the yields of dissolution of the iron contained in the raw concentrate:

| Yield of dissolution of the zinc: | 88.07 % |
|---|---|
| Yield of dissolution of the iron: | 26.80 % |

The quantity of sulphur added as sulfide compared with the stoichiometric quantity necessary to reduce the ferris iron to ferrous iron, amounts to 1.25.

The yield of reduction of ferric iron to ferrous iron = 95.88 %.

3rd stage 13,338 grammes of roasted zinc concentrate with a grain size less than 200 mesh were slowly added, over a period of 4 hours, to 175 liters of solution coming from the second stage. This operation took place at a temperature of 90° C. and the pH value was kept between 1.7 and 3.

Then a quantity of separated equal to 5 times the stoichiometric quantity necessary to oxidize the iron, was blown in.

The solution was then separated from the residue. Analyses of several elements contained in the solution and the roasted concentrate on the one hand and the products obtained on the other hand are given in Table 5, while Table 6 gives the balance of several elements.

TABLE 5

Analysis of several products

| | Feed | | Products obtained | |
|---|---|---|---|---|
| | Solution before oxidization | Roasted zinc concentrate | Solution after oxidization | Iron precipitate |
| Quantity | 175 l | 13,338 g | 175 l | 10,662 g |
| Zn | 95.99 g/l | 70.62 % | 152.19 g/l | 4.62 % |
| Fe total | 26.73 g/l | 2.62 % | 3.05 g/l | 42 % |
| $Fe^{2+}$ | 25.1 g/l | | | |
| $Fe^{3+}$ | 1 g/l | | | |
| Cd | 230 mg/l | | | |
| | | 0.043% | 262 mg/l | 0.01 % |
| Cu | 1.7 g/l | 0.117% | 1.52 g/l | 0.67 % |
| Ge | 8 mg/l | 0.0049% | 0.55 mg/l | 0.014 % |
| As | 240 mg/l | 0.038% | 0.02 mg/l | 0.39 % |
| Sb | 41 mg/l | 0.012% | 1.56 mg/l | 0.094 % |
| F | 241 mg/l | | 60.75 mg/l | 0.28 % |

TABLE 6

| | Balance of several elements (percent) | | | | | | | |
|---|---|---|---|---|---|---|---|---|
| | Zn | Fe | Cu | As | Sb | Ge | Cd | F |
| Feed: | | | | | | | | |
| Solution | 64.48 | 93.19 | 95.01 | 89.08 | 81.16 | 69.00 | 85.82 | 100.0 |
| Rst. concentrate | 35.52 | 6.81 | 4.99 | 10.92 | 18.84 | 31.00 | 14.18 | |
| Total | 100.00 | 100.00 | 100.00 | 100.00 | 100.00 | 100.00 | 100.00 | 100.0 |
| Products obtained: | | | | | | | | |
| Solution | 100.43 | 10.63 | 84.93 | 0.01 | 3.13 | 4.67 | 100.72 | 25.2 |
| Iron | 1.85 | 89.08 | 22.93 | 88.94 | 115.39 | 72.02 | 2.71 | 70.7 |
| Precipitate | −2.28 | +0.29 | −7.86 | 11.05 | −18.52 | 23.31 | −3.43 | 4.1 |
| Loss or gain | 100.00 | 100.00 | 100.00 | 100.00 | 100.00 | 100.00 | 100.00 | 100.0 |

It is particularly interesting to determine:
On the one hand, the yield of solution of the zinc contained in the neutralizing agent:

$$\frac{\text{Zn of the neutralizing agent} - \text{Zn of the iron precipitate}}{\text{Zn of the neutralizing agent}}$$

$$= \frac{35.52 - 1.85}{35.52} = 94.8\%$$

and on the other hand, the loss of copper due to the fact that part of the copper of the solution is precipitated:

$$\frac{\text{Cu contained in the precipitate} - \text{Cu contained in the neutralizing agent}}{\text{Cu in the solution before iron precipitation}}$$

$$= \frac{22.93 - 4.99}{95.01} = 18.89\%$$

This invention makes it possible, among other things, to avoid the release of dangerous gases such as arsenamine, because the crude blende is used for the reduction instead of metals. It has, furthermore, been found that when the reduction is carried out by means of a complex ore of zinc, lead, iron and copper, only zinc and copper sulfides are effective as reducing agent. This fact may be of some interest when treating such complex ores in order to obtain a good recovery of zinc and copper.

In the course of the stage in which the iron is precipitated, the elimination of certain impurities has been noticed, such as arsenic, antimony, germanium and fluorine, with better results than in other known processes.

The invention is of course not restricted to the example described above, and may be subject to modifications without going outside the scope of the invention defined by the following claims.

What I claim is:

1. In a process for the recovery of zinc values from zinc plant leaching residue containing zinc sulphide and zinc ferrites, comprising subjecting the leaching residue to a subsequent leaching using a dilute sulphuric acid solution of a concentration of 100 to 250 grams of sulphuric acid per liter, the sulphuric acid being added in a quantity two to five times the stoichiometric quantity required to dissolve the zinc contained in the leaching residue at a temperature between 50° C. and the boiling point of the leaching solution at atmospheric pressure, thereby to form a sludge of an insoluble lead residue containing insoluble elements such as lead, silver and gold, and a solution containing soluble elements such as zinc, copper, cadmium, ferric and ferrous iron and unreacted sulphuric acid, separating the lead residue from the solution, reducing said ferric iron in said separated solution to produce a sulphurous residue and a ferrous solution, and adding to said ferrous solution and neutralizing agent containing zinc oxide; the improvement comprising conducting said reducing of ferric iron with a sulphur bearing ore containing zinc sulphide in a quantity equal to 1.1 to 1.5 times the quantity necessary for the reduction of ferric iron present in the said separated solution foat the atmospheric pressure, the temperature of the solution being between 50° C. and the boiling point of the solution, adding to said ferrous solution said neutralizing agent containing zinc oxide in a quantity to obtain and maintain a pH between 1.7 and 3, and oxidizing the said ferrous solution by passing air through the said ferrous solution at atmospheric pressure and a temperature between 50 ° C. and the boiling point of said solution, thereby precipitating iron in the ferric state along with other collected impurities such as arsenic, antimony, germanium and fluorine.

2. A process as claimed in 1, wherein the reducing agent is a raw zinc concentrate.

3. A process as claimed in claim 1, wherein the reduction of iron in solution is carried out with a sulphur containing complex ore of zinc copper, lead and iron, of which the zinc and copper are dissolved in the unreacted sulphuric acid.

4. A process as claimed in claim 1, wherein the neutralizing agent containing zinc oxide is added simultaneously with the air for oxidizing the ferrous solution.

5. A process as claimed in claim 1, wherein the zinc plant residues are simultaneously treated with dilute sulphuric acid and sulphur containing ore, the resulting lead and sulphurous residue are separated from the ferrous solution and thereafter the ferrous solution is simultaneously oxidized and neutralized thus precipitating the iron.

6. A process as claimed in claim 5, wherein the residue from the neutralization of the ferrous solution is combined with zinc plant leaching residues.

* * * * *